United States Patent [19]
Bollen

[11] 4,309,094
[45] Jan. 5, 1982

[54] MULTI-ANGLE PHOTOGRAPHY

[76] Inventor: Paul C. Bollen, 1491 Union Center Hwy., Endicott, N.Y. 13760

[21] Appl. No.: 211,710

[22] Filed: Dec. 1, 1980

[51] Int. Cl.³ .................. G03B 15/06; G03B 17/24; G03B 29/00

[52] U.S. Cl. .................................. 354/80; 354/105; 354/120; 354/290; 354/292; 354/150

[58] Field of Search ................. 354/80, 106, 109, 117, 354/118, 119, 120, 122, 290, 292, 150, 105

[56] References Cited

U.S. PATENT DOCUMENTS

| | | | |
|---|---|---|---|
| 505,127 | 9/1893 | Ranger | 354/290 X |
| 2,563,451 | 8/1951 | Booth | 354/290 X |
| 2,664,780 | 1/1954 | Waller | 354/118 X |
| 3,722,997 | 3/1973 | Mendoza | 354/109 X |

Primary Examiner—Michael L. Gellner
Attorney, Agent, or Firm—George E. Clark

[57] ABSTRACT

A plurality of views of an object are simultaneously recorded on a single frame of film together with information identifying the object by a system employing a camera including a wide angle lens, and a plurality of plane mirrors each mirror positioned to reflect a predetermined view of the object where the camera directly views the object in the center of the frame and the mirrored views are shown around the periphery of the direct view and wherein the system includes object identification means mounted in spaces between the mirrors.

7 Claims, 2 Drawing Figures

MULTI-ANGLE PHOTOGRAPHY

BACKGROUND OF THE INVENTION

The present invention relates to photography and more particularly to apparatus for producing a plurality of views of an object on a single frame of film together with object identifying data.

PRIOR ART

In the prior art, there are a variety of examples of devices and apparatus for recording a plurality of images of a given object on a single frame of film. The following prior art patents have come to the attention of the inventor herein.

U.S. Pat. No. 2,664,780, and U.S. Pat. No. 2,664,784, both deal with the same apparatus with the 780 patent being a method of photographically correcting images and the 784 patent relating to the apparatus for measuring objects by photography. Both patents deal with a photographic and optical system whereby an object is placed at a predetermined point and a plurality of views of the object are then recorded on film through a very complex optical system of plane mirrors. Also, recorded on the same frame is one or more measurement indicators so that the dimensions of the object can be determined from the film. It should be noted that the apparatus of these patents does not record a direct view of the object but that each view of the object is reflected by at least one mirror before it reaches the camera. Further, the mirror system is quite complex requiring eight mirrors for four views of the object.

U.S. Pat. No. 2,704,485, shows apparatus for photographically recording information on both sides of a document simultaneously. As was mentioned with respect to the patents above, the apparatus of this patent does not provide a direct view of the object but requires a number of mirrors at least equal to the number of views in one embodiment and equal to the number of views plus one in a second embodiment.

U.S. Pat. No. 2,827,832, teaches an apparatus for simultaneously recording a view of a person and a view of a identifying document on a single frame of film. This patent does not teach multiple views of a single object on a single frame of film with a minimum number of reflective surfaces.

U.S. Pat. No. 3,063,334, shows an optical system for projecting a single image over a wide angle to obtain a "panoramic" picture. The optical system of this patent is quite complex and does not deal with the recording of multiple images of an object on a single frame of film.

U.S. Pat. No. 3,113,484, again deal with recording and projection of panoramic "stereoscopic" images. As with the patent discussed above, this patent does not show the recording of multiple images of an object on a single frame of film employing a minimum number of reflective surfaces.

U.S. Pat. No. 3,471,236, shows a prism for an optical stroboscope for viewing a rotating object.

The patent does not teach the recording of multiple views of a single object on a single frame of film with a minimum number of reflective surfaces.

West German Patent No. 895,850, apparently is an optical system including a prism and multiple plane mirrors for producing a stereoscopic effect.

As with the patents identified above, this patent does not show apparatus for recording multiple images of a single object on a single frame of film employing a minimum number of reflective surfaces.

Each of the prior art patents discussed above, provides a rather complex and cumbersome optical system which requires a number of reflective surfaces far in excess of the number of views of an object to be provided on a single frame of film.

SUMMARY OF THE INVENTION

Therefore, it is a primary object of the present invention to record on a single frame of film a direct view and a plurality of reflected views of an object employing an optical system which includes one plane mirror surface for each reflected view of the object.

It is another object of the present invention to record multiple images on a single frame of film wherein the apparatus also includes one or more means for identifying said object, the identifying means being arranged to permit simultaneous recording of identifying information for said object on the single frame of film with the direct and reflected views of the object.

It is another object of the present invention to record multiple images on a single frame of film with apparatus which includes a camera mounted along a common axis with the object to be recorded wherein the camera is mounted on a frame which permits movement of said camera along the common axis to permit precise focusing of the images of the object.

It is yet another object of the present invention to record and identify a direct image and a plurality of reflected images of a motor vehicle including information identifying the motor vehicle for the purpose of providing a permanent record of the condition of the vehicle and the identification of the vehicle at the time the record is made.

Accordingly, a multi-angle photographic apparatus includes a camera having a wide angle lens and means for focusing the camera on an object, the object being placed in a predetermined position on a surface, the object being surrounded by a plurality of a plane surface reflecting mirrors, the mirrors being positioned at predetermined locations and at predetermined angles with respect to the surface on which the object is placed, one or more of said mirrors being movable to allow the object to be placed in the predetermined position. The apparatus also includes means for displaying for recording information identifying the object to be recorded.

It is an advantage of the present invention that a direct and multiple reflected images of an object may be recorded on a single frame of film together with identifying informtion of said object through the use of an optical system which includes a single plane mirror for each reflected image of the object to be recorded.

These and other objects of the present invention will become immediately apparent from the following detailed description in conjunction with the accompanying drawing.

DETAILED DESCRIPTION OF A PREFERRED EMBODIMENT OF THE INVENTION

Figures 1, 2:
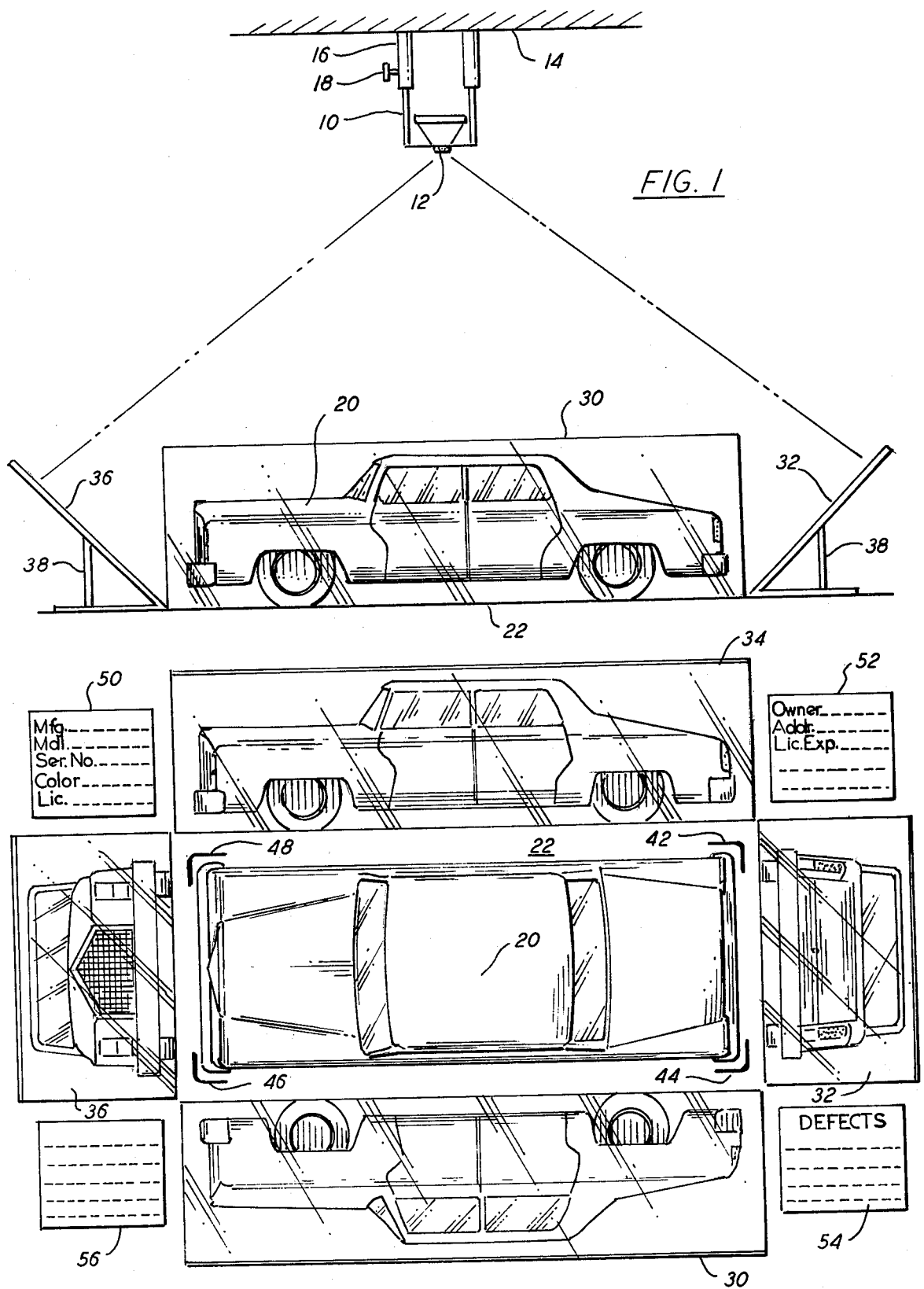
FIG. 1 is a plan view of a multi-angle photographic system according to the present invention shown with an object to be recorded in position.
FIG. 2 is a top plan view of a multi-angle photographic system according to the present invention with an object to be recorded in position.

Referring now to FIGS. 1 and 2, a multi-angle photography system according to the present invention will be described.

A camera 10 having a wide angle lens system 12 is mounted on frame 14 which holds camera 10 in position for photographing an object 20 in a predetermined location on surface 22. Camera 10 is slideably mounted to frame 14 by rack and pinion 16 which allow camera 10 to be moved along an axis between the object 20 and frame 14 under the control of rotary focus control 18. Wide angle lens system 12 provides a view of object 20 which is wide enough to also encompass a full view of mirrors 30, 32, 34 and 36 inclusive. In practice, the viewing angle of lens system 12 may be between 90 and 150 degrees. Lens system 12 has sufficient depth of focus to adequately record details of all surfaces of object 20.

Mirrors 30, 32, 34 and 36 are supported at a predetermined angle, such as 45 degrees to surface 22 by support means 38 which may be wooden or metal frames.

Referring now to FIG. 2, the recorded image for a given object such as a automobile or other motor vehicle can be seen. Surface 22 includes markers 42, 44, 46 and 48 which define an area within which the object such as a motor vehicle to be photographed must be placed for proper presentation of the various images to camera 10. Also, identification display panels 50, 52, 54 and 56 are shown. Each of the display panels 50–56, is located in a corner between adjacent mirrors 30–36 inclusive. The display panels are mounted against surface 22 to provide distortion free recording of the information contained thereon. The various display panels may include information identifying the vehicle, the owner of the vehicle, various defects in the vehicle for insurance purposes and any other information which the system use may desire to precisely identify the vehicle or object being recorded.

As stated above, FIG. 2 not only presents a top view of the apparatus according to the present invention but also depicts a frame of film with the complete identifying information recorded for a given vehicle or object. As can be seen, object 20 is located within the boundaries established by corner markers 42, 44, 46 and 48, respectively, and presents a direct view to camera 10 as well as reflections from mirrors 30, 32, 34 and 36 each mounted at predetermined angles to surface 22. Further, information display panels 50, 52, 54 and 56 located on surface 22 in the corners between the various mirrors 30–36 inclusive provides complete information concerning the object or vehicle to be recorded on a single frame of film.

For use of the system as an automobile or motor vehicle identifying and recording system, mirrors 32 and 36, respectively, would be movable to permit the vehicle to be driven to the proper position within the markings 42–48 on surface 22. Mirrors 32 and 36 will then be placed in proper position and the identifying information would be placed on the various information display panels 50–56. A single frame exposure would then provide complete information regarding the vehicle for identification, insurance and other purposes in a more efficient, time conserving and inexpensive manner than has been achieved before.

Although a preferred embodiment of the invention has been described, it will be apparent to those skilled in the art that there are many variations and modifications which may be made without departing from the spirit or scope of the invention. Therefore, the invention is not to be limited by the specific disclosure of a preferred embodiment herein, but only by the appended claims.

What is claimed is:

1. Apparatus for photographically recording a plurality of images on an object, comprising:
   a camera for recording a plurality of images of an object to be recorded on a single frame of film;
   a surface for supporting an object to be photographed, said surface being in direct view of said camara along a common axis therewith; and
   a plurality of plane mirrors mounted at a predetermined angle to said surface to reflect views of said object to said camera within the field of view of said camera so that a direct view and a plurality of reflected views of said object may be recorded on film, there being one plane mirror for each reflected view of said object to be recorded on film, wherein one or more of said plane mirrors are readily removable to permit access to said surface by said object to be recorded.

2. Apparatus according to claim 1 wherein said surface further comprises one or more locating markings on said surface for positioning of said object to be photographed.

3. Apparatus according to claim 1 wherein said predetermined angles are between 30 degrees and 60 degrees with respect to said surface.

4. Apparatus according to claim 1 further comprising means for displaying identifying information relative to said object said means for displaying indentifying information being positioned between said plane mirrors within said field of view of said camera.

5. Apparatus according to claim 1 wherein said camera is mounted in a fixed position on a frame with freedom of motion adjustment means to adjust the position of a lens system in said camera for precise focusing of the images of said object to be recorded.

6. Apparatus according to claim 1 wherein said camera further comprises a wide angle lens system, said camera being mounted in a vertical orientation to a frame above said surface, said surface having a plurality of positioning markings to facilitate placement of a motor vehicle in a predetermined position on said surface within a field of view of said camera and substantially below said camera, said plurality of plane mirrors including four plane mirrors mounted on approximately 45 degree angles to said surface each of said mirrors reflecting a view of said motor vehicle to said camera, motor vehicle identification panels mounted in spaces between said mirrors for identifying said motor vehicle, the owner of said motor vehicle and other information regarding said motor vehicle to be recorded on a single frame of film for each vehicle to be photographed.

7. Apparatus according to claim 6 wherein one or more of said plane mirrors are removable so that said motor vehicle may be driven to said predetermined position on said surface.

* * * * *